United States Patent [19]

Watanabe

[11] 4,032,942
[45] June 28, 1977

[54] PRESSURE TYPE LENS TUBE FOR SINGLE LENS REFLEX CAMERA FOR INCORPORATION IN A FOLLOW-UP TYPE APERTURE-CONTROLLED CAMERA

[75] Inventor: Sataya Watanabe, Kawasaki, Japan
[73] Assignee: Nippon Kogaku K.K., Tokyo, Japan
[22] Filed: May 23, 1975
[21] Appl. No.: 580,523
[30] Foreign Application Priority Data
  May 31, 1974  Japan .................... 49-61899[U]
  May 31, 1974  Japan .................... 49-61900[U]
[52] U.S. Cl. .................. 354/272; 354/274
[51] Int. Cl.² ........................ G03B 9/02
[58] Field of Search ......... 354/270, 272, 274, 232

[56] References Cited
UNITED STATES PATENTS

| | | | |
|---|---|---|---|
| 3,706,269 | 12/1972 | Uesugi | 354/274 |
| 3,820,124 | 6/1974 | Taguchi et al. | 354/270 X |
| 3,829,872 | 8/1974 | Ueda et al. | 354/272 X |
| 3,849,787 | 11/1974 | Nahagawa | 354/232 X |
| 3,864,714 | 2/1975 | Sasaki | 354/272 |

*Primary Examiner*—John Gonzales
*Attorney, Agent, or Firm*—Shapiro and Shapiro

[57] ABSTRACT

A lens tube for a single-lens reflex camera having a plurality of aperture blades normally pressed in the aperture-enlarging direction comprises an interlocking member operably associated with the aperture blades, a limiting member for stopping the interlocking member to determine the position of the blades for providing a desired aperture, a release means provided in interlocked relation with the shutter mechanism on the camera body and an operating member actuated from the outside to operate the interlocking member until the interlocking member is stopped by the limiting member during the initial stage of operation and to thereafter operate the release means. The lens tube can be incorporated in the conventional follow-up type aperture-controlled camera.

4 Claims, 3 Drawing Figures

PRESSURE TYPE LENS TUBE FOR SINGLE LENS REFLEX CAMERA FOR INCORPORATION IN A FOLLOW-UP TYPE APERTURE-CONTROLLED CAMERA

BACKGROUND OF THE INVENTION

1. Field of the Invention

This invention relates to a lens tube of the type having a plurality of aperture blades normally urged in the aperture-opening direction. In particular, the invention relates to such type of lens tube which can be incorporated in a conventional single-lens reflex camera of even the follow-up type.

2. Description of the Prior Art

Conventional lens tubes are of two types: a follow-up type lens tube having a plurality of aperture blades normally urged in the aperture-closing direction, and a pressure type lens tube having a plurality of aperture blades normally urged in the aperture-opening direction.

In the follow-up type lens tube, the aperture blades are placed at the full aperture position when the lens tube is set on the lens mount in the camera. When the shutter button is depressed, the blades are moved by a spring force from the full aperture position to the predetermined aperture position, and then shutter release is made. In this system, the iris diaphragm is closed by the pressure of the spring, and when a predetermined opening is provided, the movement of the aperture blades is halted by a stopper. As a result, vibration of the blades may occur. The vibration is substantial where a large-sized diaphragm is used, because the inertia of the blades is high.

In the pressure type lens tube, the aperture blades are urged in the aperture-opening direction even when it is adjusted with a camera body. When the shutter button is pushed, the blades are turned back from full aperture to the smallest opening position, followed by shutter release. In this case, although movement of the aperture blades is halted by a stopper, the blades are still pressed in the aperture-opening direction by the pressing force of the shutter button even when a desired aperture setting has been achieved, and as a result, little vibration occurs on the blades. The time required for effecting shutter release after attainment of the smallest aperture is shortened. Also, no adverse effect is caused by the inertia of the blades though the camera has a large-sized diaphragm.

However, each type of prior art lens can respectively be used only in connection with the particular type of camera body for which it has been exclusively designed. Also, in order to continuously observe the depth of field, the manual aperture-setting device of the conventional lens tube requires that the photographer push with one hand the aperture-setting button secured to the lens tube or to the camera body while, with the other hand, he turns the aperture ring on the lens tube to adjust the size of the lens opening. This is a troublesome and time-consuming operation.

SUMMARY OF THE INVENTION

An object of the present invention is to provide a pressure type lens tube which may also be employed or incorporated in a conventional camera of the follow-up type of aperture-controlling system.

Another object of the present invention is to provide a single-operation manual aperture-setting device of lens tube which allows continuous observation of the depth of field while permitting one-hand operation, and therefore, is extremely easy to operate.

DESCRIPTION OF THE PREFERRED EMBODIMENTS

Figure 1:
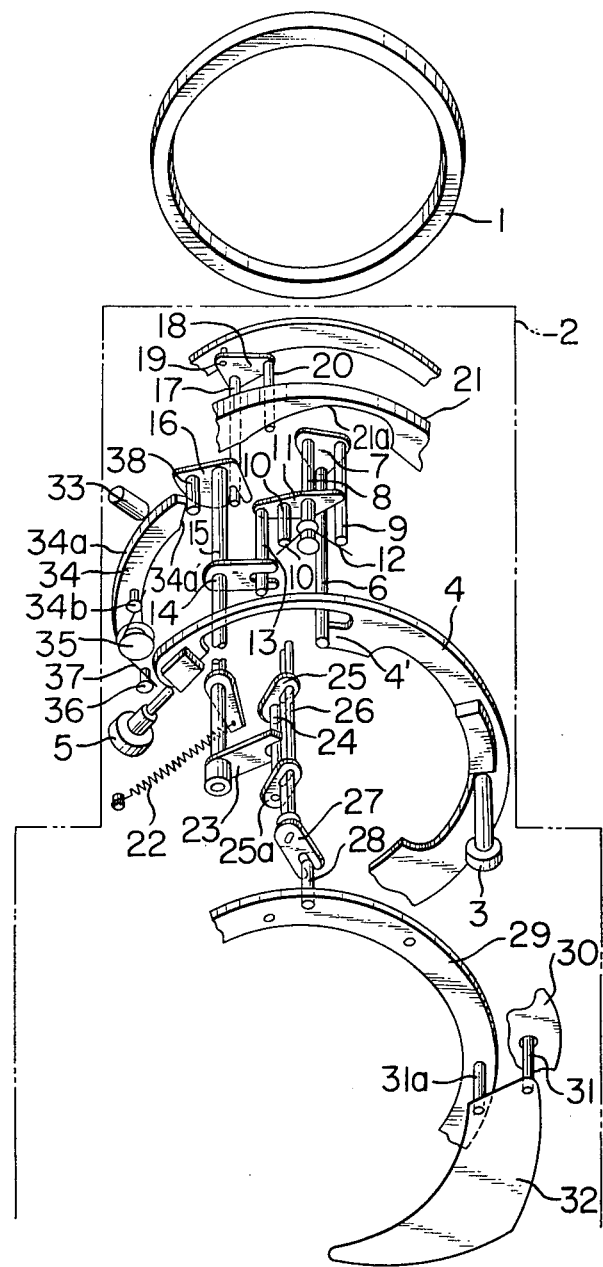
FIG. 1 is a perspective view showing the principal parts of a pressure type aperture-setting device including a single-operation manual aperture-setting means in a lens tube.

Referring to FIG. 1, 1 designates a bayonet fitted in the camera body, 2 is a lens tube housing an iris diapragm assembly therein, and 3 is an operating member which is engaged with the corresponding engaging portion of an operating ring 4 when the operating member is pushed by a cable release or by an operator's finger to cause the operating ring to be turned counterclockwise. A release means 5 is provided on the lens tube 2 for transmitting the counterclockwise turn of the operating ring 4 to the shutter button (not shown) on the camera body through a wire release. A first pin 6 is secured to a first lever 7, the pin being arranged to be engaged by a projection 4' on the operating ring 4. Also secured to said first lever 7 is a rotatable shaft 8. A second lever 11 is arranged to swing about the shaft 8. An interlocking member pressing means 12 in the form of a bent wire spring is mounted on the shaft 8 to engage and urge a spring lock pin 9 in a counterclockwise direction, and to engage and urge a second pin 10 secured on the second lever 11 in a clockwise direction. The pin 9 is secured to and extends from the first lever 7. A first fork 14 is secured to an interlocking rod 15 and engages a third pin 13 fixed to the second lever 11 to turn about the rod 15. The elements or components 3, 4 and 6-13 together constitute the operating members.

As also shown in FIG. 1, a second fork 16 having U-shaped recess is secured to the interlocking rod 15. A fourth pin 17 secured to a third lever 18 is received in the recess of the second fork. An aperture-setting pin 20 is secured to the third lever 18 to turn counterclockwise. The third lever is pivoted on a shaft 19. A limiting member 21 which, in the instant embodiment, is in the form of a cam ring has a cam face 21a. The cam ring is connected to and preferably integral with an aperture ring 39, shown in FIG. 2. The aperture ring is rotatable and serves to set the aperture to a selected value. The cam face 21a of the cam ring 2 limits rotation of the aperture-setting pin 20 to make it possible to obtain a desired lens opening. A blade-pressing means 22 which, as shown is in the form of a tension spring, is related to the interlocking rod 15 to constantly urge it in a clockwise direction to thereby urge the aperture blades in the apreture-widening direction. A third fork 23 having a U-shaped recess is secured to the interlocking rod 15. A fifth pin 24 is positioned in the recess of the fork, the pin having its ends secured to the fourth and fifth levers 25 and 25a. These two levers are slidably fitted on a rod 26, which is oval in cross section. This fifth pin 24, which is responsive to the rotation of the third fork 23, is rotatable about the oval rod 26, the rod being rotatably journalled (not shown) in the lens tube 2. A fourth fork 27 is secured to the rod 26 for rotation therewith, the fork receiving a sixth pin 28. The pin has one end secured to a swage block 29. The swage block is thereby turned by the rotation of the fourth fork 27. The parts or components 14–20 and 23–29 constitute the interlocking members.

A vane 30 is secured to the lens tube 2. One of the aperture blades 32 of a known type is shown. As known, the blades are arranged in overlapping relation to form an aperture. Joggles 31 and 31a of a known type are provided, the joggle 31 being positioned between the vane 30 and blade 32, the other joggle extending between the swage block 29 and the blade. When the swage block is turned counterclockwise by the sixth pin 28, the joggle 31a also rotates counterclockwise, while the blade 32 turns clockwise about the other joggle 31. A combination of several blades similar to the blade 32 constitutes an iris unit.

Figure 2:
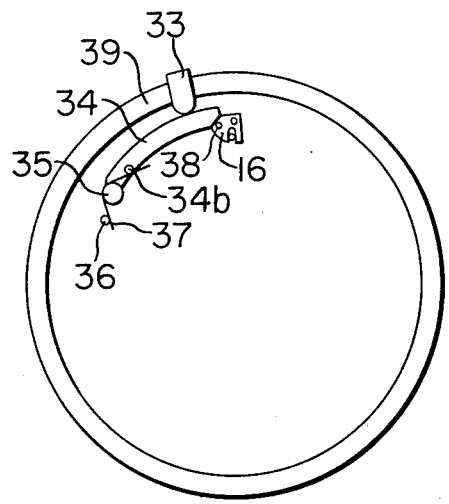
FIG. 2 is a sectional view of the lens tube showing the relation between the aperture ring and the manual aperture-setting button in the embodiment illustrated in FIG. 1.

An aperture-setting lever 34 is pivoted for rotation on a shaft 35 fixed to the lens tube 2. The lever is urged to push up a manual aperture-setting button 33 provided on the outerperiphery 34a of lever 34 by a pressing means 37 in the form of a bent wire spring provided between a seventh pin 36 secured to the lens tube and a projection 34b on the lever 34, the pressing member extending across the shaft 35. The manual aperture-setting button 33 is provided on the aperture ring 39, as shown in FIG. 2. As previously indicated, the aperture ring is connected to cam ring 21 for operation or rotation therewith. The manual aperture-setting button is arranged to be movable on the outer periphery of the lever 34 along with the aperture ring 39. The aperture-setting lever 34 has a face 34a' adapted to be engaged by an eighth pin 38 extending from the second fork 16 when the manual button 33 is operated.

Figure 3:
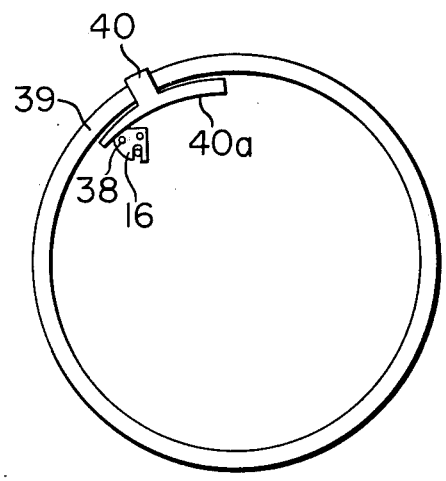
FIG. 3 is a sectional view of the lens tube showing the relation between the aperture ring and a lever-attached manual aperture iris-adjusting button in an embodiment where such button is used in lieu of the manual aperture-setting button.

In the embodiment shown in FIG. 3, a lever-attached manual iris-operating button 40 is used in lieu of the manual aperture-setting button 33 as previously described. The iris-operating button and its related parts furnish the same results as the elements 33–35 in the arrangement of FIG. 2. It is so designed that, in operation, its face 40a is maintained in engagement with the eighth pin 38 on the second fork 16. The parts 33–35 and 40 together constitute manual iris-operating members.

The operation of the devices of the invention will be described. When the operating member 3 is raised, the operating ring 4 is turned counterclockwise so that the projection 4' pushes the first pin 6 to cause the first lever 7 to turn clockwise about the shaft 8. The spring stopper pin 9 secured to said first lever 7 is also turned clockwise. The turning of the spring stopper pin 9 is transmitted to the second lever 11 through the second pin 10 by the force of the interlocking member or spring-pressing means 12, whereby the second lever 11 is caused to turn clockwise about the shaft 8. Such clockwise rotation of the second lever 11 causes the corresponding clockwise rotation of the third pin 13 on the second lever 11, while also urging the first fork 14 secured to the interlocking rod 15 to turn counterclockwise about the rod 15. Coincidently, the second fork 16 is also turned counterclockwise about the rod 15 to cause corresponding movement of the fourth pin 17 which is engaged in the U-shaped recess of the second fork 16. Movement of the fourth pin 17 causes counterclockwise movement of the third lever 18 about the pivot provided by the shaft 19, the aperture-setting pin 20 secured to the third lever 18 is engaged in and stopped by the cam groove 21a of cam ring 21. The stopping of the aperture-setting pin 20 also holds up the movements of the parts or components 11, 13–18 and 20.

Further, the movement of the third fork 23 secured to the interlocking rod 15 is transmitted through the fifth pin 24, fourth lever 25, fifth lever 25a and oval rod 26 to fourth fork 27 to allow it to turn clockwise. Such clockwise rotation of the fourth fork 27 causes the swage block 29 through the sixth pin 28 to move in a counterclockwise direction. Such movement of the swage block reduces the aperture defined by the aperture blades 32. When the rotation of the interlocking rod 15 is stopped upon engagement of the aperture-setting pin 20 in the cam groove 21a of the cam ring, the swage block 29 also ceases to turn to stop further closure of the aperture to thereby provide an opening set by the cam ring 21. The operating ring 4, however, continues to turn even after rotation of the interlocking rod 15 has stopped; that is, even after the desired aperture setting has been attained. The release means 5 provided on the lens tube 2 detects movement of the operating ring 4 to the predetermined position after setting of the aperture and issues a shutter release signal. The release signal from the release means is forwarded to the shutter button on the camera body by means of a cable release provided between the release means and the shutter button, and thereby the shutter button is depressed to effect shutter release in the known way.

The operation for continous observation of the depth of field will now be described. If the manual aperture-setting button 33 provided on the aperture ring is depressed when the operating member 3 is not in its raised position; that is, when the aperture blade 32 is in its full aperture position, the aperture-adjusting lever 34 is turned clockwise by the pressure of the button 33 thereon until the face 34a' of the lever is engaged with the eighth pin 38 secured to extend from the second fork 16, causing the second fork 16 to turn counterclockwise about the rod 15. Such rotation of the second fork 16 causes corresponding movement of the fourth pin 17 secured on the third lever 18, with the result that the aperture-setting pin 20 is engaged with the cam face of the cam ring 21 which moves together with the aperture ring 39, thereby stopping movement of the cam ring. Thus, when the aperture ring 39 is rotated while pressing the manual aperture-setting button 33 provided on the aperture ring 39 and arranged to move along the outer periphery 34a of the lever 34, the aperture-setting pin 20 which is being pressed by the cam face 21a is displaced an amount corresponding to the change of the cam face on the cam ring 21; the cam ring moves with the aperture ring. The interlocking rod 15 is rotated an amount corresponding to such displacement of the aperture-setting pin 20, and the swage block 29 is set in position in accordance with the rotation of the interlocking rod 15.

Accordingly, the described train of related elements provides an aperture corresponding to the positions of engagement of the aperture-setting pin 20 and the cam ring face 21a. As a result, it is possible to obtain a continuous aperture setting corresponding to the position of the aperture-adjusting ring 39 to afford continuous observation of the depth of field by turning the ring 39 while pushing the button 33 on the ring 39.

Where the described lever-attached manual iris-operating button 40 is used in lieu of the combination of components including the aperture-setting button 33, lever 34 and shaft 35, the face 40a of the button 40 presses against the eighth pin 38 to furnish the operation of the parts as above described.

Thus, with the device of the invention, there are provided an operating member operable from the outside and a release means interlocked with the operating member for transmitting a release signal after aperture setting, and it becomes possible to adapt the lens tube of a pressure type aperture-controlling system in a camera of the type having a follow-up aperture-controlling system without necessitating any mechanical change or revision of the camera. Also, by providing on the aperture ring an aperture-operating member for moving an interlocking member into engagement with the cam face of a limiting member in the aperture-setting operation, it is now possible to operate both the manual iris-operating member and the aperture ring with only one hand, thereby allowing continuous observation of the depth of field with ease.

It is believed that the advantages and improved results furnished by the lens tube of the invention will be apparent from the foregoing description of several preferred embodiments of the invention. Various changes and modifications may be made without departing from the spirit and scope of the invention as sought to be defined in the following claims.

I claim:

1. A lens tube for a single-lens reflex camera including a shutter mechanism on the camera body and having a plurality of aperture blades normally pressed in the aperture-opening direction, comprising, in combination, an interlocking member operably associated with said aperture blades for their displacement against the pressing force given them when the member is operated, a limiting member for stopping said interlocking member at a position corresponding to a predetermined aperture-setting operation to determine the position of said blades for a desired aperture, a release means provided in interlocked relation with the shutter mechanism to actuate the shutter mechanism, and an operating member operable from the outside of the lens tube to actuate said interlocking member until the interlocking member is stopped by said limiting member during the initial stage of operation and to thereafter operate said release means, said release means being interlocked with said operating member for transmitting a release signal after aperture setting, said interlocking member, limiting member, release means and operating member being positioned in the lens tube.

2. A lens tube as set forth in claim 1, further including a manual aperture-operating member having an operating portion operable from the outside of said lens tube and adapted to move said interlocking member until the interlocking member is stopped by said limiting member when the operating member is operated.

3. A lens tube as set forth in claim 2, wherein the operating portion of said manual aperture-operating member is mounted for rotation in said lens tube to turn together with an aperture ring adapted to set the aperture at a selected value.

4. A lens tube for a single-lens reflex camera including a shutter mechanism on the camera body and having a plurality of aperture blades normally pressed in the aperture-opening direction, comprising, in combination, an aperture ring rotatably mounted on said lens tube for setting the aperture at a selected value, an interlocking member operably associated with said aperture blades for their displacement against the pressing force given them when the member is operated, a limiting member interlocked with said aperture ring to stop said interlocking member at a position corresponding to a predetermined aperture-setting operation to determine the position of said blades for a desired aperture, and a manual aperture-operating member operable outside the lens tube having an operating portion rotatable with said aperture ring to actuate said interlocking member until the interlocking member is stopped by said limiting member.

* * * * *